United States Patent
Park et al.

(10) Patent No.: US 6,731,362 B2
(45) Date of Patent: May 4, 2004

(54) POLYMER BLEND FOR PREPARING LIQUID CRYSTAL ALIGNMENT LAYER

(75) Inventors: Jung-Ki Park, Taejon (KR); Hee-Tak Kim, Suwon (KR); Jong-Woo Lee, Seoul (KR); Shi-Joon Sung, Taegu (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 195 days.

(21) Appl. No.: 09/979,898

(22) PCT Filed: May 28, 2001

(86) PCT No.: PCT/KR01/00504

§ 371 (c)(1), (2), (4) Date: Nov. 28, 2001

(87) PCT Pub. No.: WO01/72871

PCT Pub. Date: Oct. 4, 2001

(65) Prior Publication Data

US 2002/0188075 A1 Dec. 12, 2002

(30) Foreign Application Priority Data

Mar. 29, 2000 (KR) .................................. 10-2000-0016260

(51) Int. Cl.[7] ...................... C09K 19/00; G02F 1/1337; B05D 3/06; C08L 79/08

(52) U.S. Cl. ........................ 349/123; 349/124; 349/127; 427/558; 428/1.2; 525/180

(58) Field of Search .......................... 626/180; 349/124, 349/123, 127; 427/558; 428/1.2

(56) References Cited

U.S. PATENT DOCUMENTS

| | | |
|---|---|---|
| 5,731,405 A | 3/1998 | Gibbons et al. |
| 5,773,559 A | 6/1998 | Miyamoto et al. .......... 528/353 |

*Primary Examiner*—Ana Woodward

(57) ABSTRACT

The present invention relates to a polymer blend of cinnamate polymer and polyimide polymer, which are photoreactive polymers, for preparing liquid crystal alignment layer having a high pretilt angle in photo-alignment, a process for preparing liquid crystal alignment layer by employing the said blend, a liquid crystal alignment layer prepared by the process, and a crystal cell prepared by employing the liquid crystal alignment layer. The polymer blend for preparing liquid crystal alignment layer of the invention comprises 10 to 90% (w/w) of cinnamate polymer and 10 to 90% (w/w) of polyimide polymer. Since the liquid crystal alignment layer prepared by employing the polymer blend of the invention has an excellent alignment property and thermal stability, which makes possible its wide application in the development of liquid crystal displays.

11 Claims, No Drawings

POLYMER BLEND FOR PREPARING LIQUID CRYSTAL ALIGNMENT LAYER

BACKGROUND OF THE INVENTION

1. Field of the Invention

The present invention relates to a polymer blend for preparing liquid crystal alignment layer, more specifically, to a blend of cinnamate polymer and polyimide polymer, which are photo-reactive polymers, for preparing liquid crystal alignment layer having a high pretilt angle in photo-alignment, a process for preparing liquid crystal alignment layer by employing the said blend, a liquid crystal alignment layer prepared by the process, and a crystal cell prepared by employing the liquid crystal alignment layer.

2. Description of the Prior Art

Liquid crystal displays("LCDs") have been widely used in laptop computers and car navigation systems, since they are light and small compared to the existing cathode ray tube. Further, the recent increased demand for large monitors as well as the advantages of the lightness and thinness of liquid crystal displays drives the use of LCD to desktop monitors. Most LCDs are thin film transistor-liquid crystal displays (TFT-LCD), in which the light from a fluorescence lamp is incident to a liquid crystal panel by a reflection or dispersion device, and the incident ray is passed through or intercepted by the liquid crystal layer, of which birefringence is changed depending on the voltage controlled by the thin film transistor(TFT) to display an image.

The liquid crystal panel consists of two glass plates filled with twisted nematic liquid crystals between the plates: One glass plate upon which the light is incident, comprises a thin film transistor, pixel made of indium tin oxide (ITO) and a liquid crystal alignment layer, while the other glass plate is equipped with a color filter and coated with a liquid crystal alignment layer. A polarizer is attached to the outside of both of the two glass plates. The liquid crystal alignment layer with liquid crystals is aligned in a parallel and perpendicular manner against the surface of the plate, where the liquid crystals are mechanically contacted by a rubbing method using a soft cotton or nylon velvet to a plate coated with polymers. However, the liquid crystal alignment by the rubbing method is less satisfactory in the senses of a breakage of thin film transistor, a cross-track-short due to static charge build-up and an increase of inferior quality products caused by a dust.

To overcome these shortcomings of the rubbing method, several non-contact methods for aligning liquid crystals have been studied. Among the methods, a photo-alignment method that aligns liquid crystals by means of photo irradiation to prepare a liquid crystal alignment layer, employs polymers aligning liquid crystals by means of photo-dimerization, photo-isomerization and photodecomposition, respectively. However, the polymers have revealed defects that they require a long period of photoirradiation due to a slow photoreaction or bring a low pretilt angle so the polymers are not practically employed and manufactured into a liquid crystal alignment layer.

Under the circumstances, there are strong reasons for exploring and developing an alternative polymer which can overcome the said problems for preparing a liquid crystal alignment layer.

SUMMARY OF THE INVENTION

The present inventors have made an effort to develop a novel polymer to overcome the defects of the polymers employed for a photo-alignment method, and prepared a liquid crystal alignment layer employing a polymer blend comprising cinnamate polymer and polyimide polymer, and found that a liquid crystal cell prepared by employing the liquid crystal alignment layer has a high pretilt angle and an excellent thermal stability.

The first object of present invention is, therefore, to provide a polymer blend for preparing liquid crystal alignment layer, which comprises cinnamate polymer and polyimide polymer.

The second object of the invention is to provide a process for preparing liquid crystal alignment layer by employing the polymer.

The third object of the invention is to provide a liquid crystal alignment layer prepared by the process.

The fourth object of the invention is to provide a liquid crystal cell prepared by employing the liquid crystal alignment layer.

DETAILED DESCRIPTION OF THE INVENTION

A polymer blend for preparing liquid crystal alignment layer of the present invention comprises 10 to 90% (w/w) of cinnamate polymer and 10 to 90% (w/w) of polyimide polymer: The cinnamate polymer includes polyvinylcinnamate, polyalkoxycinnamate, polyvinylfluorocinnamate, polyvinylalkoxyfluorocinnamate, and a mixture or a copolymer of said polymers, which has 10 to 500 kDa of molecular weight in average and 1 to 20 carbons, and the polyimide polymer includes poly(pyromellitic dianhydride-4,4'-oxydiamine), poly(pyromellitic dianhydride-2,2-bis[4-(4-aminophenoxy)phenyl]-hexafluoropropane), poly(pyromellitic dianhydride-2,2-bis(4-aminophenoxyphenyl)propane), poly(1,2,3,4-cyclobutanetetracarboxylic acid-4,4'-oxydiamine), poly(1,2,3,4-cyclobutanetetracarboxylic acid-2,2-bis-[4-(4-aminophenoxy)phenyl]-hexafluoropropane), poly(1,2,3,4-cyclobutanetetracarboxylic acid-2,2-bis(4-aminophenoxyphenyl)-propane), poly(2,2-bis(3,4-dicarboxyphenyl)hexafluoropropane dianhydride-4,4'-oxydiamine), poly(2,2-bis(3,4-dicarboxyphenyl)hexafluoropropane dianhydride-2,2-bis[4-(4-aminophenoxy)phenyl]-hexafluoropropane), poly(2,2-bis(3,4-dicarboxyphenyl)hexafluoropropane dianhydride-2,2-bis(4-aminophenoxyphenyl)propane), poly(pyromelliticdianhydride-2,2-bis[4-(4-aminophenoxy)phenyl]-hexafluoropropane)-4,4'-oxydiamine) or a copolymer of more than two of the said polymers, which has 10 to 300 kDa of molecular weight in average.

Meanwhile, the process for preparing liquid crystal alignment layer of the invention comprises the steps of: mixing cinnamate polymer and polyimide polymer in a ratio of 1:9 to 9:1 (w/w), and dissolving the nixed polymers in an organic solvent; spin coating the dissolved polymers onto a glass plate; heating the polymers to obtain an alignment layer; and, irradiating ultraviolet ray to the alignment layer to align liquid crystals in preferred direction Preferably, the organic solvent includes N-methyl-2-pyrrolidone, dimethylsulfoxide, dimethylacetate, metacresol, n-butylacetate and diethylether, and, the spin coating is performed at 1,000 rpm to 3,000 rpm for 10 seconds to 10 minutes and the heating is performed at the temperature of 100° C. to 300° C. for 10 seconds to 10 minutes. The ultraviolet is preferably irradiated by subjecting a polarized ray and/or a nonpolarized ray at an angle 0° to 89° with respect to a normal of surface of the layer.

In addition, a liquid crystal cell is prepared by filling with liquid crystals between two layers of the liquid crystal alignment layer prepared above.

Pretilt angle is determined by measuring the intensity of a laser beam after irradiating the laser beam to the direction of a normal with respect to the surface of liquid crystal cell, in the course of rotating the cell. In general, in the case of applying an electric field to operate a cell, liquid crystals filled in the cell stand vertical while the removal of electric field makes liquid crystals stand horizontal. Inasmuch as the standing direction is non-uniform, the cell comes to have a defect. Meanwhile, the higher the pretilt angle of liquid crystal alignment layer which makes up a liquid crystal cell is, the more the standing direction of liquid crystals is uniform. The liquid crystal cell prepared by employing the liquid crystal alignment layer of the invention shows an excellent pretilt angle compared to the conventional liquid crystal alignment layers.

On the other hand, an azimuthal anchoring energy was measured to determine the thermal stability of liquid crystal cell. The azimuthal anchoring energy determines how the liquid crystals are fixed strongly to the alignment layer and expressed as the thickness of Neel Wall observed in the liquid crystal cell. Generally, the less the energy values are, the worse the alignment of liquid crystals are. The thermal stability of liquid crystal cell is determined on the basis of the extent of lowering in an azimuthal anchoring energy in a heat-treated liquid crystal cell. Since the liquid crystal cell prepared by employing the liquid crystal alignment layer of the invention maintains a good liquid crystal alignment even under a high temperature, thermal stability is excellent. That is, the liquid crystal alignment layer has a high pretilt angle and an excellent thermal stability, which makes possible its wide application in the development of LCDs.

The present invention is further illustrated by the following examples, which should not be taken to limit the scope of the invention.

EXAMPLE 1

Preparation of a Liquid Crystal Cell(I)

A cinnamate polymer, polyvinylcinnamate(PVCi) having 100 kDa of molecular weight in average and a polyimide polymer, poly(pyromellitic dianhydride-2,2-bis[4-(4-aminophenoxy)phenyl]-hexafluoropropane)-4,4'-oxydiamine) containing 17 mole % of 2,2-bis[4-(4-aminophenoxy)phenyl]-hexafluoropropane(PMDA-BDAF17-ODA) were blended in a ratio of 5:5 (w/w) and disolved in N-methyl-2-pyrrolidone, cosolvent in a ratio of 2% (w/w). The dissolved polymers were spin coated onto a glass plate at 3,000 rpm for 3 minutes and then, the cosolvent was evaporated and heated at 180° C. for 1 hour to obtain an alignment layer. Then, ultraviolet is irradiated to the layer by subjecting a polarized ray at the angle 0° with respect to a normal of surface of the layer and subjecting a nonpolarized ray at the angle 45° to photo-align liquid crystals for preparing a liquid crystal alignment layer. Finally, a liquid crystal cell was prepared by filling liquid crystals between two of the liquid crystal alignment layers.

EXAMPLE 2

Preparation of a Liquid Crystal Cell(II)

A liquid crystal cell was prepared in a similar manner as in Example 1, except that the ratio for blending PVCi and PMDA-BDAF17-ODA was 7:3 (w/w).

Comparative Example 1

Preparation of a Liquid Crystal Cell by Employing One Polymer

A liquid crystal cell was prepared similarly as in Example 1, except for not adding PMDA-BDAF17-ODA. Then, each pretilt angle of liquid crystal cells prepared by Examples 1, 2 and Comparative Example 1 were measured and compared, respectively (see: Table 1).

TABLE 1

Comparison of pretilt angles (I)

| | Example 1 | Example 2 | Comparative Example 1 |
|---|---|---|---|
| Pretilt angle(degree) | 3.0 | 1.5 | 0.8 |

As shown in Table 1 above, it was clearly demonstrated that the higher the content of polyimide polymer is, the higher the pretilt angle is.

EXAMPLE 3

Preparation of a Liquid Crystal Cell(III)

A liquid crystal cell was prepared in a similar manner as in Example 1, except for employing poly(pyromellitic dianhydride-2,2-bis[4-(4-aminophenoxy)phenyl]-hexafluoropropane)-4,4'-oxydiamine) containing 7 mole % of 2,2-bis[4-(4-aminophenoxy)phenyl]-hexafluoropropane (PMDA-BDAF07-ODA) having 50 kDa of molecular weight, instead of PMDA-BDAF17-ODA.

EXAMPLE 4

Preparation of a Liquid Crystal Cell(IV)

A liquid crystal cell was prepared in a similar manner as in Example 1, except for employing poly(pyromellitic dianhydride-oxydiamine) (PMDA-ODA) having 50 kDa of molecular weight, instead of PMDA-BDAF17-ODA. Then, each pretilt angle of liquid crystal cells prepared in Examples 1, 3 and 4 was measured and compared, respectively (see: Table 2).

TABLE 2

Comparison of pretilt angles (II)

| | Example 1 | Example 3 | Example 4 |
|---|---|---|---|
| Pretilt angle(degree) | 3.0 | 1.2 | 0.8 |

As shown in Table 2 above, it was clearly demonstrated that: the pretilt angle of liquid crystal cell employing a polyimide polymer, PMDA-BDAF17-ODA containing 17% (w/w) of fluorine, is 3.0°; in case of PMDA-BDAF17-ODA, the angle is 1.2°; and, in case of PMDA-BDAF17-ODA not containing fluorine, the angle is 0.8°. That is, in case of liquid crystal cell employing the same content of polyimide polymer, the higher the content of fluorine is, the higher the pretilt angle is.

EXAMPLE 5

Determination of Thermal Stability

Each of three liquid crystal cells prepared by Examples 1 and 3 was left to stand at 100° C., 150° C. and 200° C. for 10 minutes, respectively. Then, each of liquid crystal alignment layers was measured for the thickness of Neel Wall to evaluate azimuthal anchoring energy and compare with that of before heat treatment (see: Table 3).

TABLE 3

Comparison of azimuthal anchoring energy(J/m$^2$)

| | Before treatment | 100° C. | 150° C. | 200° C. |
|---|---|---|---|---|
| Example 1 | 0.945 × 10$^{-6}$ | 1.231 × 10$^{-6}$ | 0.835 × 10$^{-6}$ | 0.838 × 10$^{-6}$ |
| Example 3 | 1.048 × 10$^{-6}$ | 0.954 × 10$^{-6}$ | 1.051 × 10$^{-6}$ | 0.739 × 10$^{-6}$ |

As shown in Table 3 above, it was clearly demonstrated that the liquid crystal cells prepared in Examples 1 and 3 maintain a constant energy even after heat treatment of 200° C. Considering that heat treatment of 200° C. for a liquid crystal cell employing liquid crystal alignment layers with low thermal stability makes azimuthal anchoring energy to lower to a numerical value near to zero, the results of Table 3 explain the relationship between the thermal stability of liquid crystal layers and the azimuthal anchoring energy, evidencing that the liquid crystal alignment layer of the invention has an excellent thermal stability.

As clearly described and demonstrated above, the present invention provides a polymer blend of cinnamate polymer and polyimide polymer, which are photo-reactive polymers, for preparing liquid crystal alignment layer having a high pretilt angle in photo-alignment, a process for preparing liquid crystal alignment layer by employing the said blend, a liquid crystal alignment layer prepared by the process, and a crystal cell prepared by employing the liquid crystal alignment layer. The polymer blend for preparing liquid crystal alignment layer of the invention comprises 10 to 90% (w/w) of cinnamate polymer and 10 to 90% (w/w) of polyimide polymer. The liquid crystal alignment layer prepared by employing the polymer blend of the invention has an excellent alignment property and thermal stability, which makes possible its wide application in the development of LCDs.

It will be understood that the above description is merely illustrative of the preferred embodiment and it is not intended to limit the scope of the invention to the particular forms set forth, but on the contrary, it is intended to cover such alteranatives, modifications and equivalents as may be included within the spirit and scope of the invention as defined by the claims.

What is claimed is:

1. A polymer blend for use in a liquid crystal alignment layer, the polymer blend comprising 10 to 90 wt % of at least one cinnamate polymer and 10 to 90 wt % of at least one polyimide polymer, wherein each amount of the cinnamate polymer and polyimide polymer is based on a total amount of the cinnamate and polyimide polymers, and wherein the cinnamate polymer is selected from the group consisting of polyvinylfluorocinnamate, polyvinylalkoxyfluorocinnamate, and copolymers of the foregoing polymers.

2. The polymer blend of claim 1, wherein the cinnamate polymer has an average molecular weight from 10 to 500 kDa.

3. The polymer blend of claim 1, wherein the polyimide polymer, having 10 to 300 kDa of molecular weight in average, is selected from the group consisting of poly (pyromellitic dianhydride-4,4'-oxydiamine), poly (pyromellitic dianhydride-2,2-bis[4-(4-aminophenoxy) phenyl]-hexafluoropropane), poly(pyromellitic dianhydride-2,2-bis(4-aminophenoxyphenyl)propane), poly(1,2,3,4-cyclobutanetetracarboxylic acid-4,4'-oxydiamine), poly(1,2,3,4-cyclobutanetetracarboxylic acid -2,2-bis-[4-(4-aminophenoxy)phenyl]-hexafluoropropane), poly(1,2,3,4-cyclobutanetetracarboxylic acid-2,2-bis(4-aminophenoxyphenyl)-propane), poly(2,2-bis(3,4-dicarboxyphenyl)hexafluoropropane dianhydride-4,4'-oxydiamine), poly(2,2-bis(3,4-dicarboxyphenyl) hexafluoropropane dianhydride-2,2-bis[4-(4-aminophenoxy)phenyl]-hexafluoropropane), poly(2,2-bis(3,4-dicarboxyphenyl)hexafluoropropane dianhydride-2,2-bis (4-aminophenoxyphenyl)propane), poly(pyromellitic dianhydride-2,2-bis[4-(4-aminophenoxy)phenyl]-hexafluoropropane)-4,4'-oxydiamine) and copolymers of more than two of the foregoing polymers.

4. A liquid crystal display comprising a cell filled with liquid crystals between two alignment layers, wherein at least one of the two layers comprises the polymer blend of claim 1.

5. A process for preparing a liquid crystal alignment layer, the process comprising:

(i) mixing at least one cinnamate polymer and at least one polyimide polymer in a weight ratio of the cinnamate polymer and the polyimide polymer from 1:9 to 9:1, and dissolving the mixed polymers in an organic solvent;

(ii) spin coating the dissolved polymers onto a plate;

(iii) heating the polymers to obtain liquid crystal alignment layer; and wherein the cinnamate polymer is selected from the group consisting of polyvinylfluorocinnamate, polyvinylalkoxyfluorocinnamate, and copolymers of the foregoing polymers.

6. The process of claim 5, wherein the organic solvent is selected from the group consisting of N-methyl-2-pyrrolidone, dimethylsulfoxide, dimethylacetate, metacresol, n-butylacetate and diethylether.

7. The process of claim 5, wherein the spin coating comprises rotating the plate at 1,000 rpm to 3,000 rpm.

8. The process of claim 5, wherein the heating is performed at a temperature from 100° C. to 300° C.

9. The process of claim 5, further comprising irradiating an ultraviolet ray onto the alignment layer.

10. The process of claim 9, wherein the ultraviolet ray is selected from the group consisting of a polarized ultraviolet ray, a nonpolarized ultraviolet ray, and both of the foregoings.

11. A liquid crystal alignment layer prepared by the process of claim 5.

* * * * *